(12) United States Patent
Trossen et al.

(10) Patent No.: US 7,272,122 B2
(45) Date of Patent: Sep. 18, 2007

(54) RELOCATION OF APPLICATION-SPECIFIC FUNCTIONALITY DURING SEAMLESS NETWORK LAYER-LEVEL HANDOFFS

(75) Inventors: Dirk Trossen, Cambridge, MA (US); Hemant M. Chaskar, Woburn, MA (US); Govind Krishnamurthi, Arlington, MA (US)

(73) Assignee: Nokia Corporation (FI)

( * ) Notice: Subject to any disclaimer, the term of this patent is extended or adjusted under 35 U.S.C. 154(b) by 990 days.

(21) Appl. No.: 10/144,281

(22) Filed: May 10, 2002

(65) Prior Publication Data

US 2003/0210666 A1 Nov. 13, 2003

Related U.S. Application Data

(60) Provisional application No. 60/375,414, filed on Apr. 26, 2002.

(51) Int. Cl.
G08C 17/00 (2006.01)
H04Q 7/20 (2006.01)

(52) U.S. Cl. ................ 370/331; 455/437; 455/442
(58) Field of Classification Search ............ None
See application file for complete search history.

(56) References Cited

U.S. PATENT DOCUMENTS

| | | | | |
|---|---|---|---|---|
| 6,128,503 A * | 10/2000 | Granberg et al. | ............ | 455/461 |
| 6,473,411 B1 * | 10/2002 | Kumaki et al. | ............ | 370/331 |
| 6,654,808 B1 * | 11/2003 | Chuah | ............ | 709/227 |
| 6,657,981 B1 * | 12/2003 | Lee et al. | ............ | 370/331 |
| 6,826,564 B2 * | 11/2004 | Thompson et al. | ............ | 707/4 |
| 7,043,254 B2 * | 5/2006 | Chawla et al. | ............ | 455/456.1 |
| 2001/0030953 A1 * | 10/2001 | Chang | ............ | 370/331 |
| 2002/0118656 A1 * | 8/2002 | Agrawal et al. | ............ | 370/329 |
| 2004/0192309 A1 * | 9/2004 | Watanabe et al. | ............ | 455/439 |

OTHER PUBLICATIONS

Walsh, Hybrid Networks—A Step Beyond 3G.*
Calhoun et al, Low Latency Handoffs in Mobile IPv4, Internet Draft, <draft-ietf-mobileip-lowlatency-handoffs-v4-04.txt>, Jun. 2002.
Koodli et al, Context Relocation for Seamless Header Compression in IP Networks, Internet Draft, <draft-koodli-seamoby-hc-relocate-01.txt>, Jul. 2001.

(Continued)

*Primary Examiner*—Chi Pham
*Assistant Examiner*—Ronald Abelson
(74) *Attorney, Agent, or Firm*—Banner & Witcoff, Ltd.

(57) ABSTRACT

The present invention provides a relocation of an application-specific functionality for an application that a mobile terminal (mobile node) is executing. Entities that may provide application-specific functionalities that assist the application include a location-based server (that may be associated with a supplementary service provider functionality), a transcoder proxy, and a security gateway. The relocation of the application-specific functionality with a network layer-level handoff enables the mobile terminal to seamlessly execute an application that utilizes the media content from a content source that is supporting the mobile terminal before the handoff. Subsequent to the handoff, the mobile terminal registers with a current access router in order to inform the current access router about application context information. In the exemplary embodiments, the access routers and the content source support the discovery of an entity that can support the application-specific functionality and the configuration of the application-specific functionality after the handoff.

52 Claims, 6 Drawing Sheets

OTHER PUBLICATIONS

Westphal et al, Context Relocation of QoS Parameters in IP Networks, Internet Draft, <draft-westphal-seamoby-qos-relocate-00.txt>, Jul. 2001.
Johnson et al, Mobility Support in IPv6, Internet Draft, <draft-ietf-mobileip-ipv6-15.txt>, Jul. 2001.
Levkowetz et al, Reasons for Performing Context Transfers Between Nodes in an IP Access Network, Internet Draft, <draft-ietf-seamoby-context-transfer-problem-stat-04.txt>, May 2002.
Syed et al, General Requirements for a Context Transfer Framework, Internet Draft, <draft-ietf-seamoby-ct-reqs-00.txt>, May 2001.
Syed et al, QoS (Diffserv) Context Transfer, Internet Draft, <draft-hamid-seamoby-ct-qos-context-00.txt>, Jun. 2001.
Koodli et al, A Context Transfer Framework for Seamless Mobility, Internet Draft, <draft-koodli-seamoby-ctv6-01.txt>, Jul. 2001.
Yegin et al, Fast Handovers for Mobile IPv6, Internet Draft, <draft-ietf-mobileip-fast-mipv6-04.txt>, Mar. 2002.
Hamer et al, Issues in IPSec Context Transfer, Internet Draft, <gopal-seamoby-ipsecctxt-issues-01.txt>, Feb. 2002.
Krishnamurthi et al, Requirements for Car Discovery Protocols, Internet Draft, <draft-krishnamurthi-seamoby-car-requirements-01.txt>, Jan. 2002.
IP Mobility Support, C. Perkins, Ed., Network Working Group, RFC 2002, Oct. 1996.
Trossen et al., Issues in Candidate Access Router Discovery for Seamless IP-Level Handoffs, Internet Draft draft-ietf-seamoby-cardiscovery-issues02.txt, Jan. 2002.
Rajeeve Koodli, et al., "Fast Handovers and Context Transfers in Mobile Networks" Computer Communication Review, Association for Computing Machinery, New York, USA, vol. 31, No. 5, Oct. 2001, pp. 37-47, XP-001115324, ISSN: 0146-833, Abstract, Paragraphs 0002-0006, 0041 and 04.2.
Ali Mahmoodian, et al., "A Resource Allocation Mechanism to Provide Guaranteed Service to Mobile Multimedia Applications" IEEE/POPOV Workshop on Internet Technologies and Services. Proceedings of IEE-RPS Joint Conference on Internet Technologies and Services, Oct. 25, 1999, pp. 9-17, XP-002172325.
Stathes Hadjiefthymiades, et al., "A Resource Management Scheme for Efficient WWW Computing in Wireless Communications" Vehicular Technology Conference, 1999. VTC 1999—Fall. IEEE VTS 50$^{th}$ Amsterdam, Netherlands Sep. 19-22, 1999, Piscataway, NJ, USA, IEEE, US, vol. 3, Sep. 19, 1999, pp. 1755-1759, XP-10353269, ISBN: 0-7803-5435-4, Abstract, paragraphs 0001-0002.
Muhammad Jaseemuddin, et al., "A Study of Profiled Handoff for Diffserv-Based Mobile Nodes" Wireless Communications and Mobile Computing, vol. 2, Mar. 7, 2002, pp. 339-356, XP-002966426, Abstract, paragraph 001, 04.1 and 04.3.

* cited by examiner

RELOCATION OF APPLICATION-SPECIFIC FUNCTIONALITY DURING SEAMLESS NETWORK LAYER-LEVEL HANDOFFS

"This application claims priority to provisional U.S. patent application Ser. No. 60/375,414 ("Proactive Seamless Service Provisioning in Mobile Networks Through Registering and Transferring of Application Context in a Proactive-Committing Manner"), filed Apr. 26, 2002."

FIELD OF THE INVENTION

The present invention relates to the relocation of an application-specific functionality, such as a supplementary service provider functionality, for a mobile terminal during a network layer-level handoff.

BACKGROUND OF THE INVENTION

Providing seamless services is a critical issue for mobile networks. In the context of services supported by the Internet protocol (IP), seamless IP-layer connectivity is necessary as a mobile terminal hands off to a new access router with minimal disruption to the mobile terminal's Internet connectivity. There are several approaches to providing IP connectivity. First, the mobile IP protocol describes a mechanism that allows packets to be routed through the Internet to a new access router when the mobile terminal changes its point of attachment to the Internet from an old access router to the new access router. Also, after having established link-layer connectivity with the new access router, the mobile terminal engages in signaling the new access router in order to obtain its new care-of-address. When obtaining the new care-of-address the mobile terminal has acquired IP-level connectivity with the new access router so that the mobile terminal can transmit and receive packets with the new access router. A fast handoff protocol enables forming the new care-of-address while the mobile terminal is still attached to the old access router. As soon as the mobile terminal acquires link-layer connectivity with the new access router, the mobile terminal can transmit and receive packets with the new access router.

Moving the mobile terminal's point of attachment to the Internet from the current access router to the new access router may not suffice to provide seamless service if the mobile terminal's application requires additional features for packet transport such as transport quality of service (QoS), security, and header compression. These features need to be provided at the new point of mobile terminal's attachment to the Internet after IP-layer handoff. This can be achieved via context transfer framework.

Current approaches to a context transfer framework limit solutions to seamless IP-layer connectivity and do not address the service and business related aspects. In other words, ability to exchange packets with the Internet in an uninterrupted fashion in the light of handoffs as considered by current approaches, does not necessarily mean that the multimedia application on the mobile terminal will continue seamlessly. This is because, applications may make use of certain application-specific network functionalities, which may need to be relocated or provisioned concurrently with IP-layer handoffs.

For example, a mobile terminal (mobile node) may be accessing an Internet application that is provided by a content source such as line navigation, which depends upon the mobile terminal's geographical location. Typically, the content source uses a supplementary service provider functionality that is specific to the network serving the mobile terminal. In the case of a location service, for example, selecting the supplementary service provider functionality according to the serving network may be necessitated by the dependence of radio access technology that the mobile terminal is utilizing (global positioning satellites, time difference of arrival, angle difference of arrival, RF badges, and so forth) as well as by the physical wireless environment (e.g. indoor or outdoor). Moreover, the supplementary service provider functionality is accessing highly confidential data, namely the mobile terminal's location, and hence the supplementary service provider functionality has a special trust relationship with the administrative entity of the network domain that is serving the mobile terminal.

If the mobile terminal hands off to another administrative domain, either by migrating to another network operator that uses the same radio technology as the previous network operator or by switching to another radio access technology of another network operator, the current supplementary service provider functionality may not be able to provide mobile terminal's location information to customize the content from the content source to the mobile terminal. Even though the mobile terminal may experience seamless IP-network connectivity, an application that the mobile terminal is utilizing before the handoff may not be able to continue after the IP-level handoff because the content source does not have access to an appropriate supplementary service provider functionality. Hence, with the increasing importance of supporting enhanced services to a mobile terminal over the Internet, there is a need to support application-specific functionality in a seamless manner.

SUMMARY OF THE INVENTION

The aspects of the present invention provide a relocation of an application-specific functionality for an application that a mobile node such as a mobile terminal is executing. Entities that may provide application-specific functionalities that assist the application include a location tracking server (that may be associated with a supplementary service provider functionality), a transcoder proxy, and a security gateway. The relocation of the application-specific functionality with a network layer-level handoff (e.g. an IP-level handoff) enables the mobile terminal to seamlessly execute an application that utilizes the media content from a content source that is supporting the mobile terminal before the handoff Prior to the handoff, the mobile terminal registers with a current access router in order to inform the current access router about application context information.

In a first exemplary embodiment of the invention, preceding the handoff, the current access router informs a new access router about application context information that is indicative of the required application-specific functionality. Subsequently, the new access router discovers an entity that can support the application-specific functionality in the associated wireless network. The new access router also configures the application-specific functionality and informs the content source to continue the packet data stream to a new care-of address after the handoff and to utilize the configured application-specific functionality. It may also inform the mobile terminal about the address and characteristics of the configured application-specific functionality.

In another exemplary embodiment of the invention, the content source discovers the entity that can support the application functionality in the associated wireless network. Also, the content source configures the application-specific functionality. The content source may continue transmitting the packet data stream to the mobile terminal utilizing a new care-of address that is provided by the new access router.

In another exemplary embodiment of the invention, the new access router discovers the entity that can support the application functionality in the associated wireless network. The content source is provided information about the discovered entity, and the content source subsequently performs its part of configuration of the application-specific functionality. The content source may continue transmitting the packet data stream to the mobile terminal utilizing a new care-of address that is provided by the new access router. The mobile terminal may also be informed about the discovered entity, and the mobile terminal subsequently performs its part of configuration of the application-specific functionality.

DETAILED DESCRIPTION OF THE INVENTION

Figure 1:
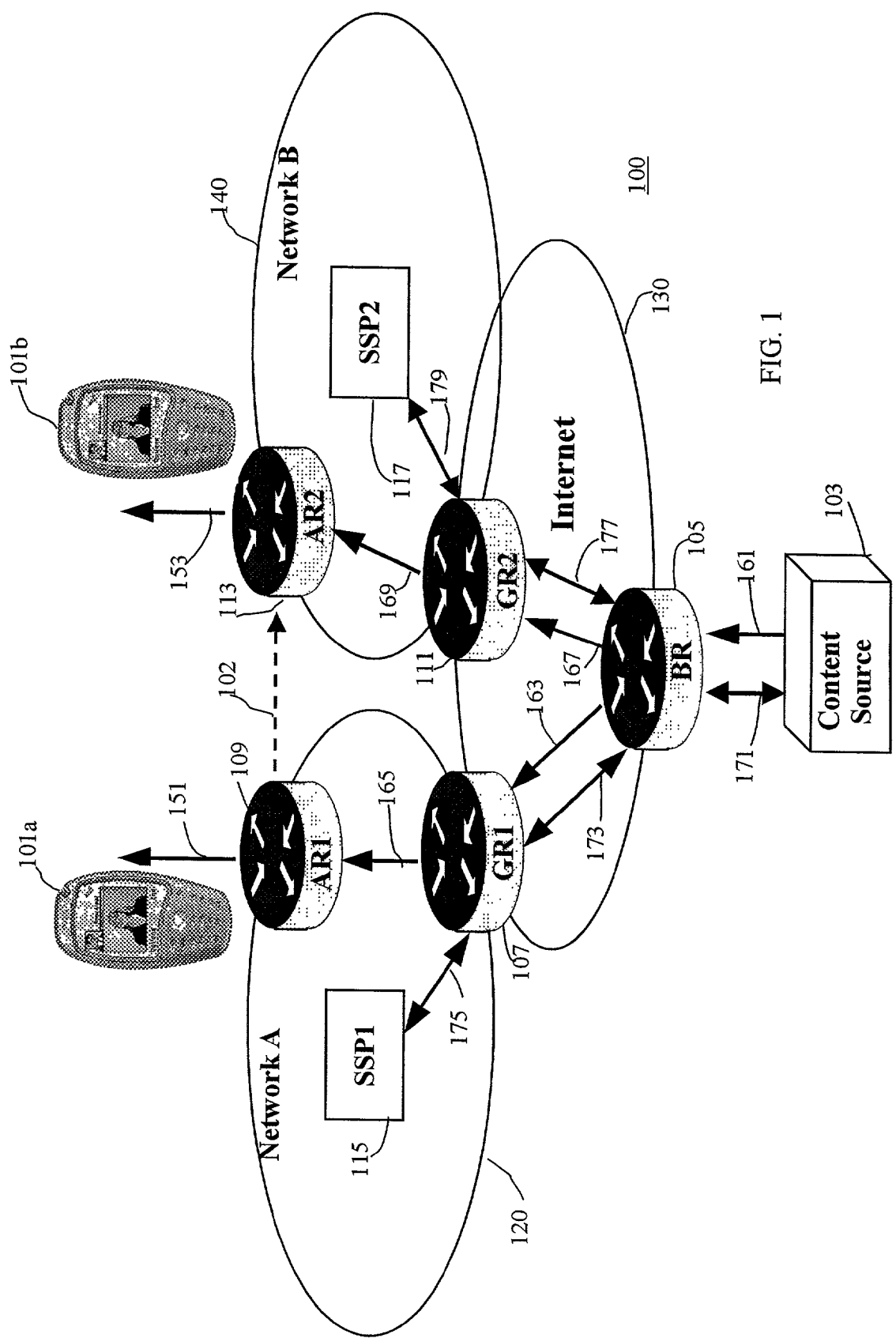
FIG. 1 shows a first architecture supporting an application-specific functionality, such as a supplementary service provider functionality according to some embodiments of the invention.

FIG. 1 shows an architecture 100 that supports an application-specific functionality, such as a supplementary service provider (SSP) functionality, in accordance with some embodiments of the invention (as will be discussed in the context of FIGS. 3, 4, and 5). In FIG. 1, a mobile node such as a mobile terminal 101a receives packets from a content source 103 through a path 161, a border router (BR) 105, a path 163, a gateway router (GR) 107, a path 165, an access router (AR) 109, and a wireless communications channel 151. In the embodiments, paths 161, 163, and 165 may utilize an Internet protocol (IP). The packets may support different types of content including audio, video, and multimedia formats. In the exemplary embodiments, the packets are transported through the Internet 130 that utilizes IP, although other embodiments may support other network layer protocols.

Mobile terminal 101a is served by a wireless network 120, which is connected to Internet 130 through gateway router 107. Access router 109 typically communicates to mobile terminal 101a through a base transceiver station (BTS) that may support different wireless technologies such as code division multiple access (CDMA), global system for mobile communications (GSM), and IEEE 802.11 (Wireless Local Area Networks Standards).

In the exemplary embodiments, a service that is provided to mobile terminal 101a may comprise the content generated by content source 103 in concert with a supplementary service functionality that is provided by a supplementary service provider (SSP) 115. Supplementary service provider 115 serves a mobile terminal 101a when the mobile terminal 101a is located within network 120.

The content from content source 103 may be dynamically modified according to information about mobile terminal 101a as determined by supplementary service provider 115. With the exemplary embodiments shown in FIGS. 3, 4, and 5, for example, content source 103 may use location information about mobile terminal 101a for location-dependent content in which mobile terminal 101a is provided driving instructions to a designated location. Location-based information may also be used to provide targeted advertisements to mobile terminal 101a. Content source 103 communicates with supplementary service provider 115 through a path 171, border router 105, a path 173, gateway router 107, and a path 175.

A supplementary service provider (e.g. SSP 115) is typically specific to a network (e.g. network 120) in which mobile terminal 101a is currently attached. With some embodiments, the utilized technology for the provision of the supplementary service functionality may be different for different networks (e.g. network 120 and network 140). With a location tracking supplementary service functionality, supplementary service provider 115 and supplementary service provider 117 may utilize time/angle difference of arrival, global positioning satellites (GPS), coarse tracking based on cell number, or indoor tracking using RF badges, depending upon the underlying radio technology and the physical environment of the associated network. (For example, network 120 may support analog service while network 140 supports third generation digital service. Or, network 120 may be outdoor cellular network while network 140 could be indoor wireless LAN.) The difference of radio technologies and physical environments may necessitate that supplementary service providers 115 and 117 utilize different location algorithms.) Also, a network administrator of network 120 or 140 may not be able to utilize an associated supplementary service provider functionality when mobile terminal 101a is not located in the administrator's network domain.

Mobile terminal 101a may charge its location within network 120 (as characterized by mobility) and may be subsequently served by a network 140 if mobile terminal 101a migrates into network 140. Network 140 may serve a different geographical area and may utilize a different wireless technology than network 120. If mobile terminal 101a moves into network 140 (as shown as a mobile terminal 101b) continued service needs to utilize a different supplementary service provider, thus necessitating a change from supplementary service provider 115 to supplementary service provider 117. Some embodiments of the invention (corresponding to FIGS. 3, 4, and 5) reconfigure the service so that supplementary service provider 117 provides the supplementary service functionality after the completion of an IP-level handoff 102. After handoff 102 mobile terminal 101b receives packets from content source 103 through path 161, border router 105, a path 167, a gateway router 111, a path 169, an access router 113, and a wireless communications link 153. Content source 103 communicates with supplementary service provider 117 through, path 171, border router 105, a path 177, gateway router 111, and a path 179.

Figure 2:
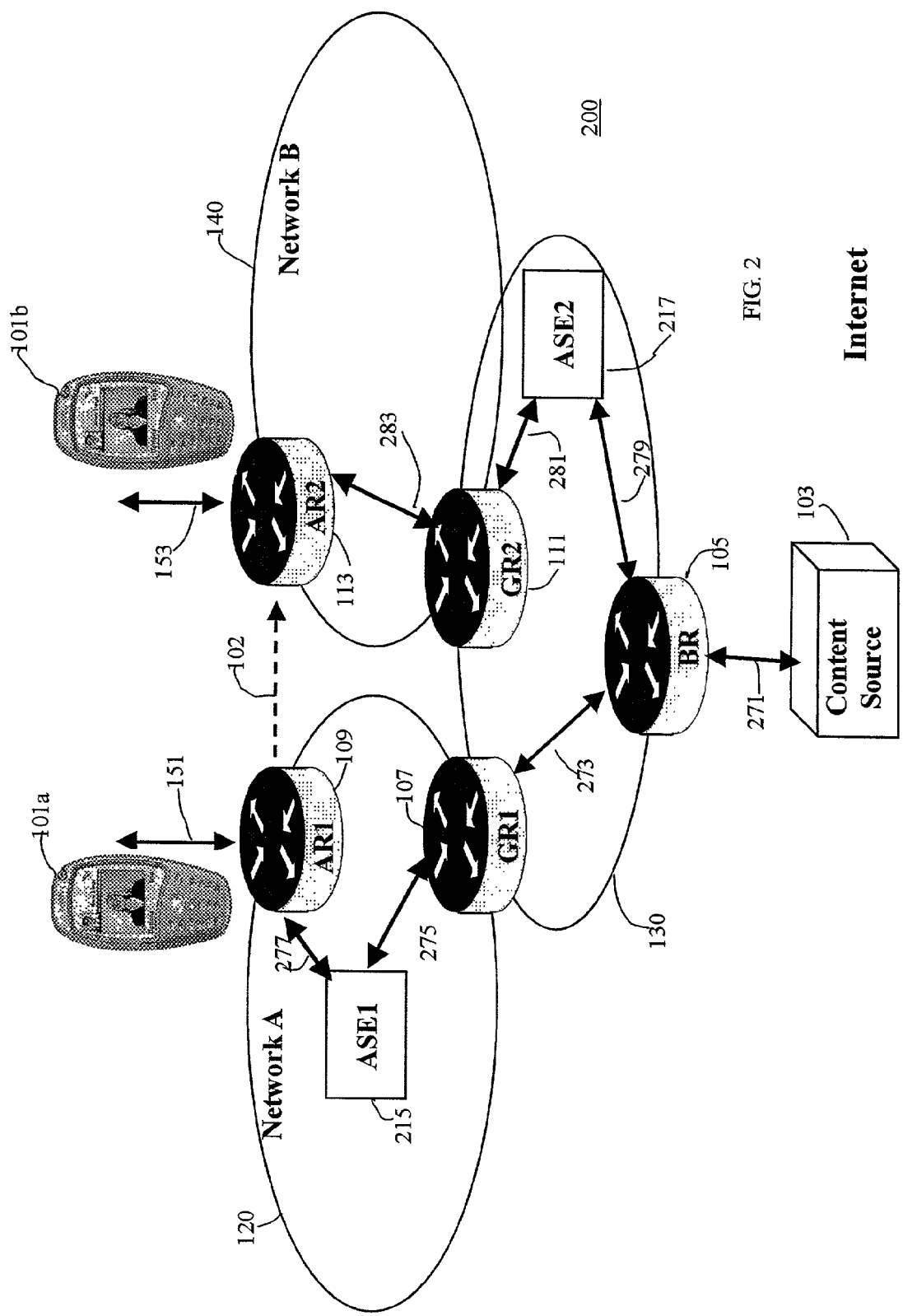
FIG. 2 shows a second architecture supporting an application-specific functionality according to some exemplary embodiments of the invention.
Figure 3:
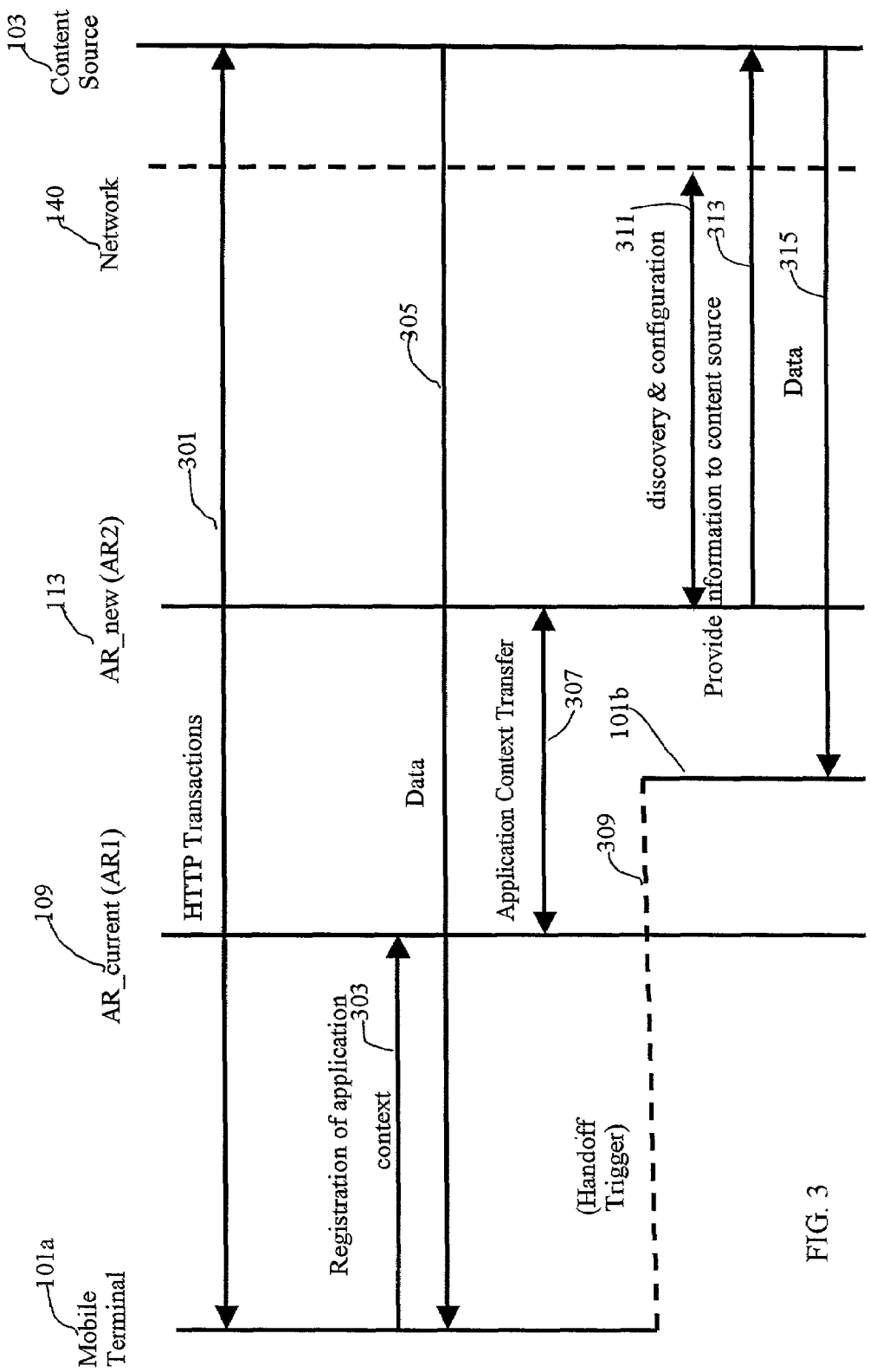
FIG. 3 shows a messaging scenario in which an access router discovers and configures an application-specific functionality according to an embodiment of the invention.
Figure 4:
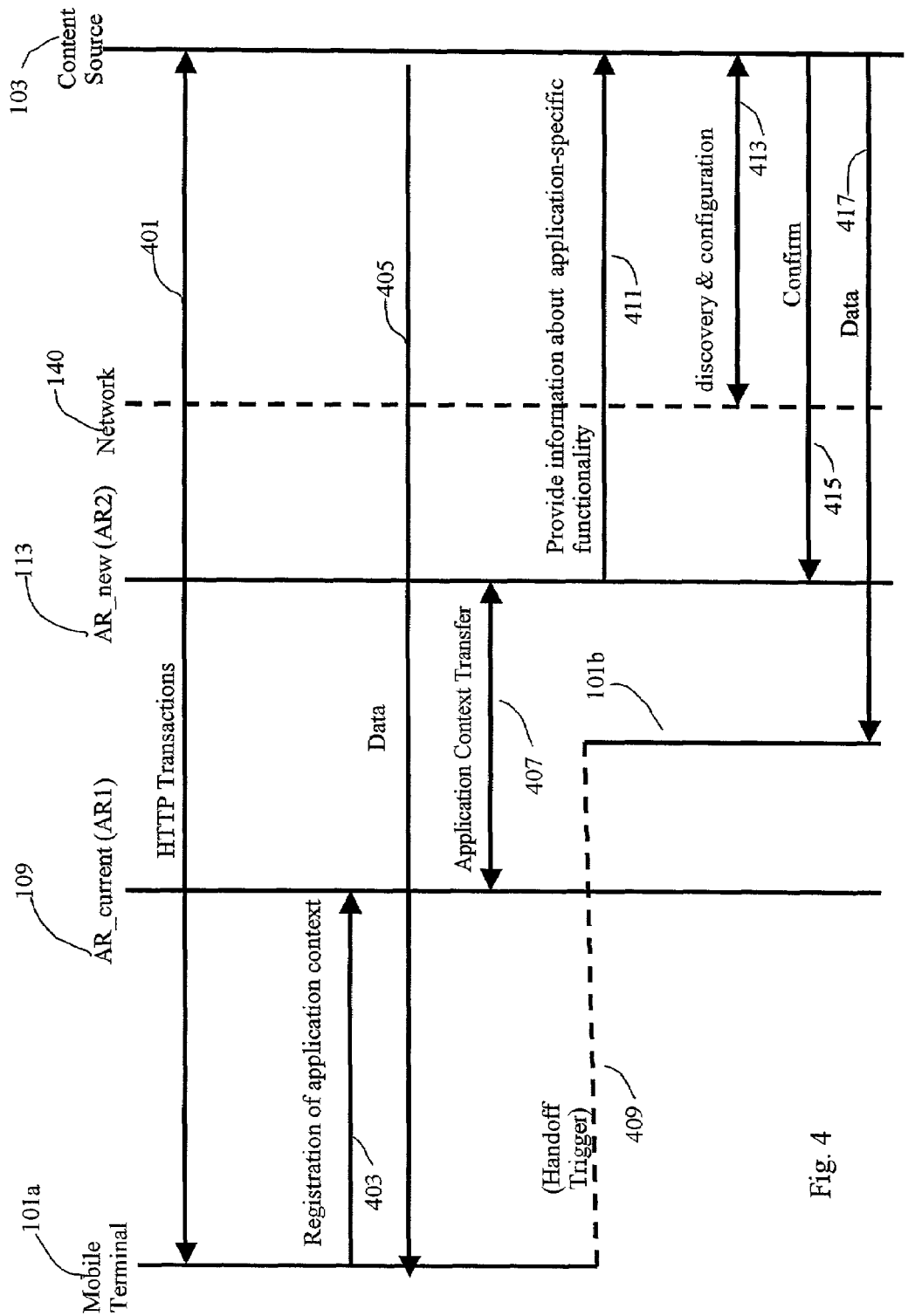
FIG. 4 shows a messaging scenario in which a content source discovers and configures an application-specific functionality according to an embodiment of the invention.
Figure 5:
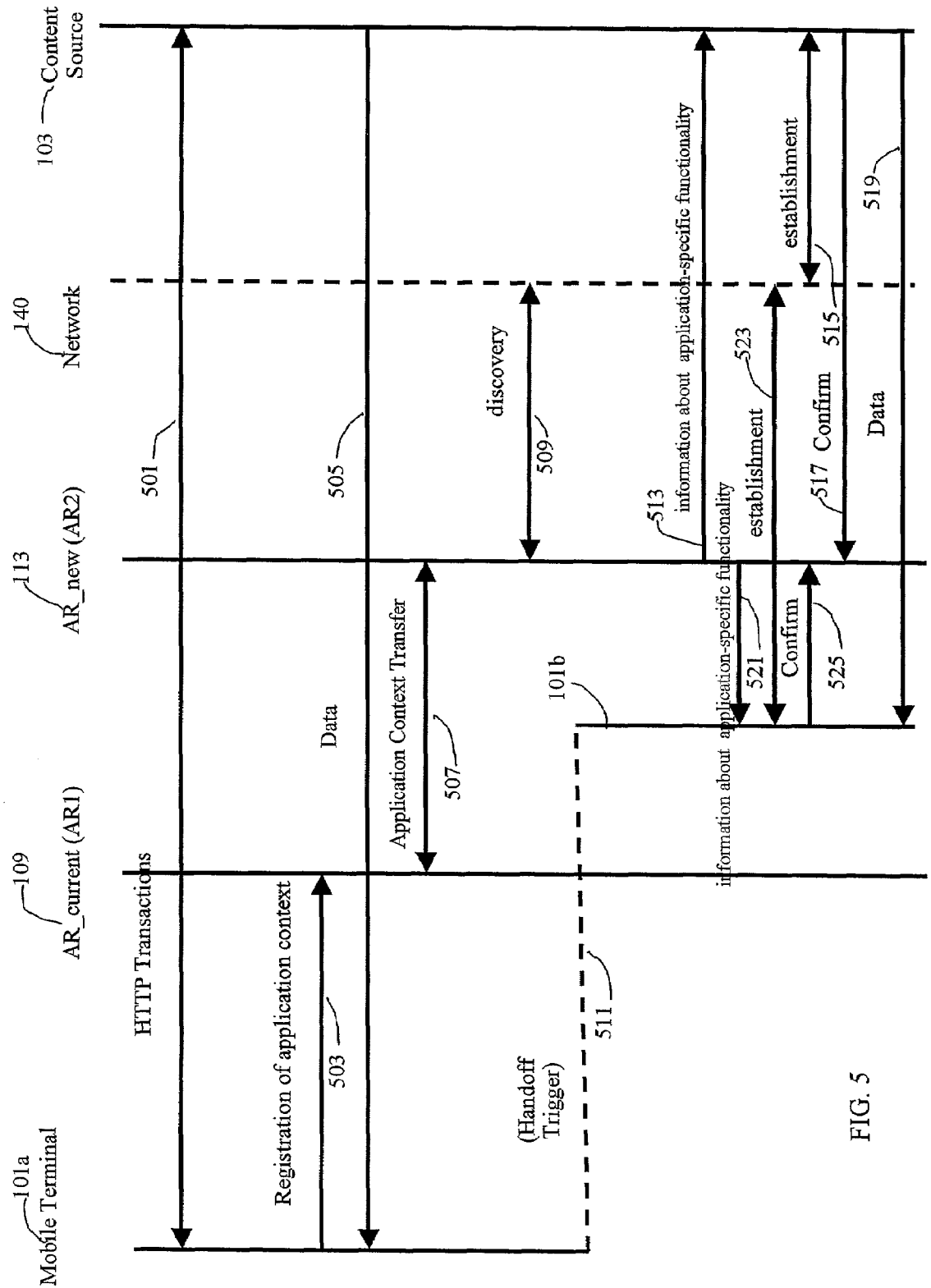
FIG. 5 shows a messaging scenario in which a hybrid approach is utilized to discover and to establish an application-specific functionality according to an embodiment of the invention.

FIG. 2 shows an architecture 200 supporting an application-specific entity (ASE) 215 or 217 according to exemplary embodiments of the invention that are shown in FIGS. 3, 4, and 5. Application-specific entities 215 and 217 provide an application-specific functionality. An application-specific functionality may support fundamental functionality such as security functionality and transcoding functionality. With architecture 200, application-specific entity 215 intervenes between communicating endpoints (e.g. mobile terminal 101a and content source 103). Application-specific entities may support a packet data stream from content source 103 (e.g. a transcoder) or packets from mobile terminal 101a and content source 103 (e.g. a security gateway). Content source 103 communicates to 101a through a path 271, border router 105, a path 273, gateway router 107, a path 275, application-specific entity 215, a path 277, access router 109, and wireless communications channel 151.

With architechure 200, applicationspecihe entity 215 may be a transcoding function that supports format conversion, data size reduction and customizing multimedia web content such as images and video. The transcoding function enables transmission between communication endpoints (e.g. mobile terminal 101a and content source 103) to be delivered over low bandwidth and error-prone wireless links and to be processed according to capabilities of mobile terminal 101a. If for example, mobile terminal 101a initiates a streaming video application from a third generation (3G) cellular coverage area (corresponding to network 120) and hands off into a second generation (2G) cellular coverage area (e.g. network 140), an appropriate transcoding function (e.g. application-specific entity 217) may need to be configured in order to match the bandwidth constraints of network 140. Moreover, application specific entity (such as a transcoding entity) 215 may not be accessible because packets may be directly transmitted from content source 103 and network 140. After handoff 102, content source 103 communicates with mobile 101b (as designated after handoff 102) through path 271, border router 105, a path 279, application specific entity 217, a path 281, gateway router 111, a path 283, access router 113, and wireless communications link 153.

Application-specific entity 215 may also support a security function. Security associations may be at an application level or at a network level (e.g. IP). With an IP-level security association, 215 may utilize IPsec, in which a security association can be established using either an Internet Key Exchange (IKE) protocol or a manual configuration procedure. IPsec tunneling encapsulates the original packet inside a new packet.

An IPsec security association may be established between security gateways (as may be supported by application-specific entity 215 and application-specific entity 217) and communication endpoints (such as content source 103). In such a case, mobile terminal 101a relies on a security gateway (application-specific entity 215) when attached to access router 109 (serving network 120). Packets from mobile terminal 101a traverse between application-specific entity 215 and content source 103 in a secure manner. When mobile terminal 101a (designated as 101b after handoff 102) handoffs from network 120 to network 140, a new IPsec security association is established between application-specific entity 217 and content source 103.

FIG. 3 shows a messaging scenario in which access router 113 discovers and configures an application-specific functionality according to a first exemplary embodiment of the invention. With a transactions procedure 301, mobile terminal 101a and content source 103 set up a data session in order to initiate the packet data stream from current content source 103 to mobile terminal 101a through current access router 109. Typically, current access router 109 is unaware of specific characteristics of end-user applications being executed by mobile terminal 101a. In the embodiment, hyper text transfer protocol (in accordance with Internet Engineering Task Force RFC 2616) is utilized, although other embodiments may utilize session initiation protocol (SIP in accordance with Internet Engineering Task Force RFC 2543) or other protocols. The content of the HTTP or SIP messages that are exchanged between mobile terminal 101a and content source 103 are typically not visible to current access router 109 during transaction 301. Consequently, a registration procedure 303 is executed by mobile terminal 101a in order to explicitly register application context information with current access router 109. The application context information indicates the required application-specific functionality. In the embodiment, registration procedure 303 utilizes Internet control message protocol (ICMP that is specified in Internet Engineering Task Force RFC 792), user datagram protocol (UDP), transmission control protocol (TCP), or any standard method of message transfer between nodes in an IP network. Other embodiments may utilize other protocols such as hypertext transfer protocol.

The format of the application context information is dependent upon the specific application. In the embodiment, the application context information comprises an content profile and a media description. Some exemplary applications include location service applications, transcoder service applications, and security gateway applications. With a location service application, the application context information may describe a need for a location server and a content source (e.g. content source 103) that is authorized to receive location information. With a transcoder service application, the application context information may describe a media coding scheme, required bandwidth, and quality of service (QoS) for transmission of video content. With a security gateway application, the application context information may describe a need for a security gateway, parameters for security processing, and an identity of the content source (e.g. content 103).

A packet data stream 305 may be generated by content source 103 in order to support the application as established in transaction procedure 301 and forwarded by current access router 109 to mobile terminal 101a as packet data stream 305. Packets associated with packet data stream 305 are typically delivered to mobile terminal 101a utilizing a care-of address (Internet Engineering Task Force RFC 3220 and draft-ietf-mobileip-ipv6-16.txt) if mobile terminal 101a is not located in a region that is served by its home agent such as a router. The care-of address is the termination point of a tunnel toward a mobile node such as mobile terminal 101a for packets forwarded to mobile terminal 101a when mobile terminal 101a is not located in its home serving area.

If mobile terminal 101a approaches the boundary between network 120 and network 140, current access router 109 may determine that an IP-level handoff may occur. In the exemplary embodiment, a base transceiver station that is serving mobile terminal 101a and that is associated with access router 109 measures the signal strength of mobile terminal 101a (corresponding to the reverse/forward direction or the uplink/downlink). If the signal strength is below a signal threshold, the base transceiver station notifies current access router 109 about the impending handoff When current access router 109 determines that an IP-level handoff may occur, current access router 109 provides new access router 113 with the application context information by sending an application context transfer message 307 to new access router 113. The embodiment can utilize ICMP, UDP, TCP, stream control transmission protocol (SCTP) (Internet Engineering Task Force RFC 2960), or any method for transferring messages between two nodes in an IP network. Consequently, new access router 113 performs a discovery and configuration procedure 311 in order to find supplementary service provider 117 or application-specific entity 217 that can provide the application-specific functionality in network 140 in order to support the media content being utilized by mobile terminal 101*b* (as designated for the mobile terminal after a handoff 309). In the embodiment, new access router 113 can discover supplementary service provider 117 or application-specific entity 217 by using a static configuration (e.g. accessing a data structure that is maintained at new access router 113 in which an address of supplementary service provider 117 or application-specific entity 217 is mapped to the required functionality as deduced from the received application context), accessing a directory agent that may be external to new access router 113, or sending a multicast query within network 140 that contains the profile of required application-specific functionality. New access router 113 may utilize service location protocol (Internet Engineering Task Force RFC 2165) with the inclusion of a proprietary or standardized field (service profile) that designates the type of application-specific functionality that is required (e.g. transcoder or location-based service). With the multicast query, supplementary service provider 117 or application-specific entity 217 responds to the query if supplementary service provider 117 or application-specific entity 217 can support mobile terminal 101*b* in network 140.

New access router 113 also configures the application specific functionality with supplementary service provider 117 or application-specific entity 217. With a location-based supplementary service provider functionality, the application context information may indicate that location service is required and may identify that content source 103 is authorized to receive location information about mobile terminal 103. New access router 113 may authorize supplementary service provider 117 to provide information about mobile terminal 102*b* to content source 103. New access router 113 can utilize protocols such as Internet control message protocol (ICMP), user datagram protocol (UDP), and transmission control protocol (TCP) to issue a command to supplementary service provider 117.

With a message 313, new access router 113 provides information about supplementary service provider 117 or application-specific entity 217 to content source 103. For a location tracking supplementary service functionality, message 313 may include an address of supplementary service provider 117 and a new-care of address (associated with mobile terminal 101*b*) to content source 103 so that content source 103 may modify content that is dependent upon the location of mobile terminal 101*b* and deliver the content to mobile terminal 101*b*. Delivery of content commences with a packet data stream 315 when mobile terminal 101*a* handoffs to network 140 as a result of handoff trigger 309.

FIG. 4 shows a messaging scenario in which content source 103 discovers and configures an application-specific functionality according to another exemplary embodiment of the invention. With a transactions procedure 401, mobile terminal 101*a* and content source 103 set up a data session in order to initiate the packet data stream from current content source 103 to mobile terminal 101*a*. Typically, current access router 109 is unaware of specific characteristics of end-user applications being executed by mobile terminal 101*a*. In the embodiment, hyper text transfer protocol is utilized, although other embodiments may utilize session initiation protocol or other protocols. The content of messages, such as HTTP or SIP messages, that are exchanged between mobile terminal 101*a* and content source 103 are typically not visible to current access router 109 during transaction 401. Consequently, a registration procedure 403 is executed by mobile terminal 101*a* in order to explicitly register application context information with current access router 109. In the embodiment, registration procedure 403 utilizes Internet control message protocol, user datagram protocol (UDP), transmission control protocol (TCP), or any standard method of message transfer between nodes in an IP network. Other embodiments may utilize other protocols such as hypertext transfer protocol.

A packet data stream 405 is generated by content source 103 in order to support the application as established in transaction procedure 401 and forwarded by current access router 109 to mobile terminal 101*a* as packet data stream 405. Packets associated with packet data stream 405 are typically delivered to mobile terminal 101*a* utilizing a care-of address if mobile terminal 101*a* is not located in a region that is served by its home agent (router). The care-of address is the termination point of a tunnel toward mobile terminal 101*a* for packets forwarded to mobile terminal 101*a* when mobile terminal 101*a* is not located in its home serving area.

If mobile terminal 101*a* approaches the boundary between network 120 and network 140, current access router 109 may determine that an IP-level handoff may occur. In the embodiment, a base transceiver station that is serving mobile terminal 101*a* and that is associated with access router 109 measures the signal strength of mobile terminal 101*a* (corresponding to the forward/reverse direction or the downlink/uplink). If the signal strength is below a signal threshold, the base transceiver station notifies current access router 109 about the impending handoff. When current access router 109 determines that an IP-level handoff may occur, current access router 109 provides new access router 113 with the application context information by sending an application context transfer message 407 to new access router 113. The embodiment can utilize ICMP, UDP, TCP, stream control transmission protocol (SCTP) (Internet Engineering Task Force RFC 2960), or any method for transferring messages between two nodes in an IP network. New access router 113 processes the application context information. The embodiment, for example, may determine the need for transcoding service if bandwidth capabilities of network 140 cannot support the complete bandwidth requirements of the content. In such a case, new access router 113 may compare bandwidth and QoS requirements that are specified in the application context information with the corresponding characteristics of the IP connection between mobile terminal 101*b* and new access router 113. New access router may determine if application-specific functionality such as transcoding functionality is needed.

New access router 113 notifies content source 103 about the need for application-specific functionality (e.g. transcoding functionality) as well as information such as a session identity, a new care-of-address for mobile terminal 101*b*, and the characteristics of the IP connection between mobile terminal 102*b* and new access router 111 by sending a message 411. Consequently, content source 103 initiates a discovery and configuration procedure 413.

Content source 103 performs discovery and configuration procedure 413 in order to find supplementary service provider 117 or application-specific entity 217 that can provide the application-specific functionality to support the media content being utilized by mobile terminal 101b (as designated for the mobile terminal after a handoff 409). In the exemplary embodiment, content source 103 can discover supplementary service provider 117 or application-specific entity 217 by using a static configuration (e.g. accessing a data structure that is maintained at content source 103 in which an address of supplementary service provider 117 or application-specific entity 217 is mapped to the required application-specific functionality), accessing a directory agent that may be external to content source 103, or sending a multicast query that contains the profile of the required application-specific functionality. Content source 103 may utilize the service location protocol with the inclusion of a proprietary or standardized field (service profile) that designates the type of application-specific that is required (e.g. transcoder or location-based service). With the multicast query, supplementary service provider 117 or application-specific entity 217 responds to the query if supplementary service provider 117 or application-specific entity 217 can support mobile terminal 101b in network 140.

Content source 103 configures the application-specific functionality (e.g. transcoding functionality) by inviting supplementary service provider 117 or application-specific entity 217 to the session. In the exemplary embodiment, content source 103 sends a SIP INVITE message, in accordance with the session initiation protocol, to supplementary service provider 117 or application-specific entity 217 in order to provide information such as media and bandwidth information and the new care-of address of mobile terminal 101b. Content source 103 consequently sends a SIP INVITE message to mobile terminal 102b at the new care-of address with appropriate information (e.g. information about the transcoded packet stream) in order to complete the configuration procedure. In the other embodiment, the content source 103 may send a confirm message 415 to mobile terminal 102b through new access router 113 rather than send the SIP INVITE message to mobile terminal 102b.

A packet data stream 417 (corresponding to the media transfer) is initiated from content source 103 to mobile terminal 101b. For an application-specific functionality such as transcoding, the media transfer is transmitted to application-specific entity 217 (acting as a transcoding proxy) and from application-specific entity 217 to mobile terminal 103 using the new care-of address of mobile terminal 101b.

FIG. 5 shows a messaging scenario in which a hybrid approach is utilized to discover and to configure an application-specific functionality according to another exemplary embodiment of the invention. With a transactions procedure 501, mobile terminal 101a and content source 103 set up a data session in order to initiate a packet data stream from current content source 103 to mobile terminal 101a. Typically, current access router 109 is unaware of specific characteristics of end-user applications being executed by mobile terminal 101a. In the embodiment, hyper text transfer protocol is utilized, although other embodiments may utilize session initiation protocol or other protocols. The content of the HTTP or SIP messages that are exchanged between mobile terminal 101a and content source 103 are typically not visible to current access router 109 during transaction 501. Consequently, a registration procedure 503 is executed by mobile terminal 101a in order to explicitly register application context information with current access router 109. In the embodiment, registration procedure 503 utilizes Internet control message protocol, user datagram protocol (UDP), transmission control protocol (TCP), or any standard method of message transfer between nodes in an IP network Other embodiments may utilize other protocols such as hypertext transfer protocol.

A packet data stream 505 is generated by content source 103 in order to support the application as established in transaction procedure 501 and forwarded by current access router 109 to mobile terminal 101a as packet data stream 505. Packets associated with packet data stream 505 are typically delivered to mobile terminal 101a utilizing a care-of address if mobile terminal 101a is not located in a region that is served by its home agent (router). The care-of address is the termination point of a tunnel toward mobile terminal 101a for packets forwarded to mobile terminal 101a when mobile terminal 101a is not located in its home serving area.

If mobile terminal 101a approaches the boundary between network 120 and network 140, current access router 109 may determine that an IP-level handoff may occur. In the embodiment, a base transceiver station that is serving mobile terminal 101a and that is associated with access router 109 measures the signal strength of mobile terminal 101a (corresponding to the forward/reverse direction or the downlink/uplink). If the signal strength is below a signal threshold, the base transceiver station notifies current access router 109 about the impending handoff. When current access router 109 determines that an IP-level handoff may occur, current access router 109 provides new access router 113 with the application context information by sending an application context transfer message 507 to new access router 113. The embodiment can utilize ICMP, UDP, TCP, stream control transmission protocol (SCTP) (Internet Engineering Task Force RFC 2960), or any method for transferring messages between two nodes in an IP network. New access router 113 processes the application context information.

Consequently, new access router 113 performs a discovery procedure 509 in order to find supplementary service provider 117 or application-specific entity 217 that can provide the application-specific functionality to support the media content being utilized by mobile terminal 101b (as designated for the mobile terminal after a handoff 511). In the embodiment, new access router 113 can discover supplementary service provider 117 or application-specific entity 217 by using a static configuration (e.g. accessing a data structure that is maintained at new access router 113 in which an address of supplementary service provider 117 or application-specific entity 217 is mapped to the profile of the required application-specific functionality), accessing a directory agent that may be external to new access router 113, or sending a multicast query that contains the profile of the required application-specific functionality. New access router 113 may utilize the service location protocol with the inclusion of a proprietary or standardized field (service profile) that designates the type of application-specific that is required (e.g. transcoder or location-based service). With the multicast query, supplementary service provider 117 or application-specific entity 217 responds to the query if supplementary service provider 117 or application-specific entity 217 can support mobile terminal 101b in network 140.

With a variation of the embodiment, current access router 109 may perform discovery procedure 509 in order to find supplementary service provider 117 or application-specific entity 217 that can provide the application-specific functionality in network 140. In such a case, current access router 109 provides information about application-specific functionality to content source 103.

Subsequent to new access router 113 discovering supplementary service provider 117 or application-specific entity 217 that can support the application-specific functionality, new access router sends a message 513 to content source 103 with information about the application-specific functionality that was discovered during procedure 509. New access router 113 also sends a message 521 to mobile terminal 101b with information about the application-specific functionality that may include the address of application-specific entity 217 or supplementary service provider 117. Mobile terminal 101b may authorize application-specific entity 217 or supplementary service provider 117 to provide the application-specific functionality for its applications. Also, mobile terminal 101b may also create any states that are needed for availing the functionality. Mobile terminal 101b completes the configuration with network 140 with an establishment procedure 523 and confirms the configuration by sending a confirm message 525 to new access router 113. Content source 103 completes the configuration with supplementary service provider 117 or application-specific entity 217 with a procedure 515. For example, for an application-specific functionality corresponding to a security gateway, content source 103 may build a security association with the security gateway (e.g. application-specific entity 217).

Figure 6:
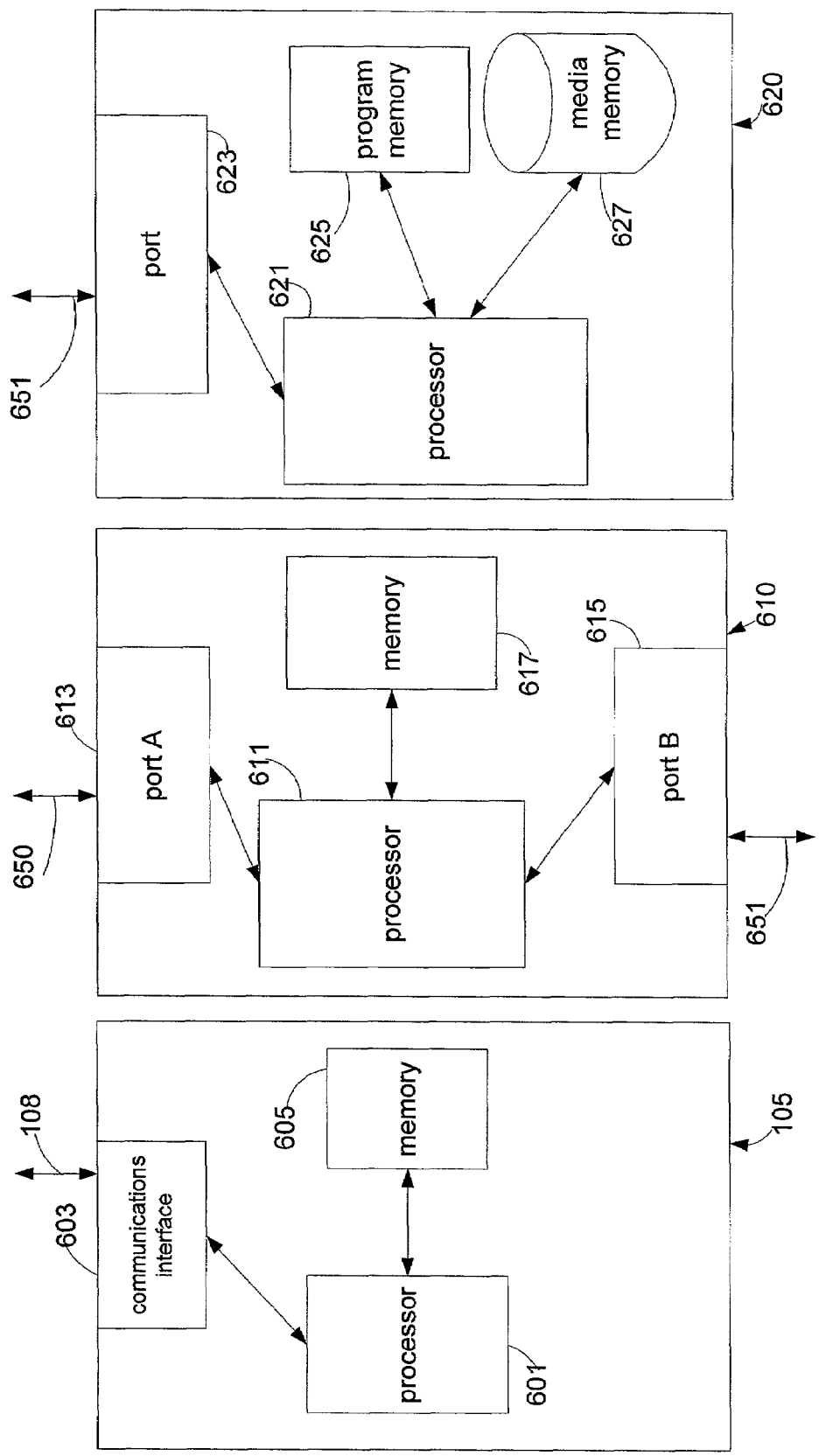
FIG. 6 shows apparatus for a mobile terminal, an access router, and a content source in accordance with an embodiment of the invention.

FIG. 6 shows apparatus for mobile terminal 105, an access router 610 (e.g. current access router 109 and new access router 113), a content source 620 (e.g. content source 103) in accordance with the exemplary embodiments of the invention. Mobile terminal 105 comprises a processor 601, a communications interface 603, and a memory 605. Mobile terminal 105 communicates over wireless channel 108 through communications interface 603. Processor 601 executes a software program from memory 605 in accordance with the message scenarios shown in FIGS. 3, 4, and 5.

Access router 610 comprises a processor 611, ports 613 and 615, and a memory 617. Processor 611 communicates with a base transceiver station through port 613 through an IP path 650 and with content source 620 through port 615 and an IP path 651. Processor 611 executes a software program from memory 617 in accordance with the message scenarios shown in FIGS. 3, 4, and 5.

Content source 620 comprises a processor 621, a port 623, a program memory 625 and a media memory 627. Processor 621 communicates with access router 610 through port 623 and IP path 651. Processor 621 executes a software program from program memory 625 in accordance with the message scenarios shown in FIGS. 3, 4, and 5. Also, processor 621 generates a packet data stream by accessing media memory 627 in order to obtain the media content that is being played for the data session.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A mobile terminal, comprising:
   a communications interface;
   a processor communicating through the communications interface, the processor configured to cause the mobile terminal to perform a method comprising:
   (a) initiating an application with a content source;
   (b) receiving a packet data stream that is associated with the application;
   (c) registering application context information comprising an application-specific functionality information; and
   (d) continuing to receive the packet data stream in response to the mobile terminal completing a network layer-level handoff.

2. The mobile terminal of claim 1, wherein the method the processor is configured to perform further comprises:
   (e) initiating the network layer-level handoff.

3. The mobile terminal of claim 1, wherein the method the processor is configured to perform further comprises:
   (e) receiving a second information comprising an address of an entity that provides the application-specific functionality.

4. The mobile terminal of claim 3, wherein the method the processor is configured to perform further comprises:
   (f) adjusting a processing of the packet data stream in accordance with the second information.

5. The mobile terminal of claim 3, wherein the second information is selected from the group consisting of a bandwidth requirement and a media format.

6. The mobile terminal of claim 3, wherein the method the processor is configured to perform further comprises:
   (f) communicating with the entity in order to establish a state that is required to avail the application-specific functionality.

7. The mobile terminal of claim 3, wherein the method the processor is configured to perform further comprises:
   (f) authorizing the entity to perform the application-specific functionality.

8. An access router comprising:
   a data port;
   a processor communicating through the data port, the processor configured to cause the access router to perform a method comprising:
   (a) receiving a registration message containing application context information, the application context information comprising an application-specific functionality information; and
   (b) sending the application context information to another access router.

9. An access router comprising:
   a data port;
   a processor communicating through the data port, the processor configured to cause the access router to perform a method comprising:
   (a) receiving a registration message containing application context information, the application context information comprising an application-specific functionality information;
   (b) discovering an entity that shall provide the application-specific functionality; and
   (c) providing an address and additional information about the entity to a communication end-point.

10. The access router of claim 9, wherein the communication end-point is selected from the group consisting of a mobile terminal and a content source.

11. An access router comprising:
a data port;
a processor communicating through the data port, the processor configured to cause the access router to perform a method comprising:
(a) receiving an application context information, the application context information comprising an application-specific functionality information;
(b) discovering an entity that shall perform application-specific functionality;
(c) configuring the application-specific functionality for a mobile terminal with the entity in response to a network-layer handoff; and
(d) providing an address and additional information about the entity to a communication end-point.

12. The access router of claim 11, wherein the method the processor is configured to perform further comprises:
(e) comparing contents of the application context information with characteristics of a connection between the access router and the mobile terminal in order to determine the application-specific functionality.

13. The access router of claim 11, wherein step (b) comprises
(i) sending a multicast query within an associated network, the query containing an indicator about the application-specific functionality; and
(ii) receiving a response from the entity, the response indicating that the entity can support the application-specific functionality.

14. The access router of claim 11, wherein step (b) comprises:
(i) accessing a data structure that contains configuration information about the application-specific functionality.

15. The access router of claim 11, wherein step (b) comprises:
(i) querying a directory agent about the application-specific functionality; and
(ii) receiving a response from the directory agent about the entity.

16. The access router of claim 11, wherein step (b) utilizes a service profile, the service profile designating a type of application-specific functionality.

17. The access router of claim 11, wherein step (c) comprises:
(i) establishing the application-specific functionality for the mobile terminal with the entity.

18. The access router of claim 11, wherein step (c) comprises:
(i) authorizing the application-specific functionality for the mobile terminal with the entity.

19. The access router of claim 11, wherein the application-specific functionality comprises a supplementary service functionality.

20. The access router of claim 11, wherein the communication end-point is selected from the group consisting of the mobile terminal and a content source.

21. A content source comprising:
a port;
a memory; and
a processor that accesses the memory to obtain media content, forms a packet data stream from the media content, and sends the packet data stream through the port in order to support an application, the processor configured to cause the content source to perform a method comprising:
(a) responding to an initiation of the application with a mobile terminal;
(b) sending the packet data stream that is associated with the application;
(c) receiving information comprising an address of an entity that provides application-specific functionality; and
(d) continuing to send the packet data stream in response to the mobile terminal completing a network layer-level handoff.

22. An access router comprising:
a data port;
a processor communicating through the data port, the processor configured to cause the access router to perform a method comprising:
(a) receiving an application context information, the application context information comprising an application-specific functionality information; and
(b) providing session information about the application-specific functionality.

23. The access router of claim 22, wherein the method the processor is configured to cause the access router to perform further comprises:
(c) comparing contents of the application context information with characteristics of a connection between the access router and a mobile terminal in order to determine the application-specific functionality.

24. The access router of claim 22, wherein the session information comprises a description of the application-specific functionality and a new care-of address that is associated with the mobile terminal.

25. The access router of claim 22, wherein the session information comprises an address of an entity, the entity being capable of discovering the application-specific functionality.

26. A content source comprising:
a port;
a memory; and
a processor that accesses the memory to obtain media content, forms a packet data stream from the media content, and sends the packet data stream through the port in order to support an application, the processor configured to cause the content source to perform a method comprising:
(a) responding to an initiation of the application with a mobile terminal;
(b) sending the packet data stream that is associated with the application;
(c) receiving information about application-specific functionality;
(d) discovering an entity that shall perform the application-specific functionality;
(e) configuring the application-specific functionality for a mobile terminal with the entity in response to a network-layer handoff; and
(f) continuing to send the packet data stream in response to the mobile terminal completing the network layer-level handoff.

27. An access router comprising:
a data port;
a processor communicating through the data port, the processor configured to cause the access router to perform a method comprising:
(a) receiving an application context information, the application context information comprising an application-specific functionality information;
(b) discovering an entity that shall perform the application-specific functionality; and
(c) providing information about the application-specific functionality and an address to a communication end-point.

28. A content source comprising:
a port;
a memory; and
a processor that accesses the memory to obtain media content, forms a packet data stream from the media content, and sends the packet data stream through the port in order to support an application, the processor configured to cause the content source to perform a method comprising:
(a) responding to an initiation of the application with a mobile terminal;
(b) sending the packet data stream that is associated with the application;
(c) receiving information about application-specific functionality comprising an address of an entity that can provide the application-specific functionality;
(d) configuring the application-specific functionality for the mobile terminal with an entity corresponding to the information; and
(e) continuing to send the packet data stream in response to the mobile terminal completing a network layer-level handoff.

29. A method comprising:
(a) initiating an application with a content source and a mobile terminal;
(b) receiving a packet data stream that is associated with the application;
(c) registering an application context information comprising an application-specific functionality information;
(d) continuing to receive the packet data stream in response to the mobile terminal completing a network layer-level handoff.

30. The method of claim 29, further comprising:
(e) initiating the network layer-level handoff.

31. The method of claim 29, further comprising:
(e) receiving a second information comprising an address of an entity that provides application-specific functionality.

32. The method of claim 31, further comprising:
(f) adjusting a processing of the packet data stream in accordance with the second information.

33. A method comprising:
(a) receiving a registration message containing application context information related to an application on a mobile terminal, the application context information comprising an application-specific functionality information; and
(b) sending the application context information to another entity.

34. The method of claim 33, wherein the other entity is another access router.

35. A method comprising:
(a) receiving a registration message containing application context information related to an application on a mobile terminal, the application context information comprising an application-specific functionality information;
(b) discovering an entity that shall perform the application-specific functionality; and
(c) providing an address and additional information about the entity to a communication end-point.

36. A method comprising:
(a) receiving an application context information related to an application on a mobile terminal, the application context information comprising an application-specific functionality information;
(b) discovering an entity that shall perform application-specific functionality;
(c) configuring the application-specific functionality for the mobile terminal with the entity in response to the network-layer handoff; and
(d) providing an address and additional information about the entity to a communication end-point.

37. The method of claim 36, the method further comprising:
(e) comparing contents of the application context information with characteristics of a connection between an access router and the mobile terminal in order to determine the application-specific functionality.

38. The method of claim 36, wherein step (b) comprises:
(i) sending a multicast query within an associated network, the query containing an indicator about the application-specific functionality; and
(ii) receiving a response from the entity, the response indicating that the entity can support the application-specific functionality.

39. The method of claim 36, wherein step (c) comprises:
(i) establishing the application-specific functionality for the mobile terminal with the entity.

40. The method of claim 36, wherein step (c) comprises:
(i) authorizing the application-specific functionality for the mobile terminal with the entity.

41. A method comprising:
(a) responding to an initiation of an application with a mobile terminal;
(b) sending a packet data stream that is associated with the application;
(c) receiving information comprising an address of an entity that supports application-specific functionality; and
(d) continuing to send the packet data stream in response to the mobile terminal completing a network layer-level handoff.

42. A method comprising:
(a) receiving an application context information related to an application on a mobile terminal, the application context information comprising an application-specific functionality information; and
(b) providing session information about application-specific functionality.

43. The method of claim 42, further comprising:
(c) comparing contents of the application context information with characteristics of a connection between an access router and the mobile terminal in order to determine the application-specific functionality.

44. A method comprising:
(a) responding to an initiation of an application with a mobile terminal;
(b) sending a packet data stream that is associated with the application;
(c) receiving information about the application-specific functionality;
(d) discovering an entity that shall perform the application-specific functionality;
(e) configuring the application-specific functionality for the mobile terminal with the entity in response to a network-layer level handoff; and
(f) continuing to send the packet data stream in response to the mobile terminal completing the network layer-level handoff.

45. A method comprising:
(a) receiving an application context information related to an application on a mobile terminal, the application context information comprising an application-specific functionality information;
(b) discovering an entity that shall perform application-specific functionality; and (c) providing session information about the application-specific functionality.

46. A method comprising:
(a) responding to an initiation of an application with a mobile terminal;
(b) sending a packet data stream that is associated with the application;
(c) receiving information about application-specific functionality;
(d) configuring the application-specific functionality for the mobile terminal with an entity corresponding to the information; and
(f) continuing to send the packet data stream in response to the mobile terminal completing a network layer-level handoff.

47. A computer-readable medium containing instructions that cause a mobile terminal to perform a method comprising:
(a) initiating an application with a content source;
(b) receiving a packet data stream that is associated with the application;
(c) registering an application context information comprising an application-specific functionality information; and
(d) continuing to receive the packet data stream in response to the mobile terminal completing a network layer-level handoff.

48. A computer-readable medium containing instructions that cause an access router to perform a method comprising:
(a) receiving a registration message containing application context information, the application context information comprising an application-specific functionality information; and
(b) sending the application context information.

49. A computer-readable medium containing instructions that cause an access router to perform a method comprising:
(a) receiving an application context information, the application context information comprising an application-specific functionality information; and
(b) providing information about application-specific functionality.

50. The computer-readable medium of claim 49, wherein the method that the instructions cause the access router to perform further comprises:
(c) discovering an entity that shall perform the application-specific functionality.

51. The computer-readable medium of claim 50, wherein the method that the instructions cause the access router to perform further comprises:
(d) configuring the application-specific functionality for a mobile terminal with the entity in response to a network-layer handoff.

52. A mobile terminal comprising:
a communications interface;
a processor communicating through the communications interface, the processor configured to cause a mobile terminal to perform a method comprising:
(a) initiating an application with a content source;
(b) receiving a packet data stream that is associated with the application;
(c) registering an application, context information comprising an application-specific functionality information;
(d) receiving a second information comprising an address of an entity that provides application-specific functionality;
(e) continuing to receive the packet data stream; and
(f) processing the packet data stream in accordance with the second information.

* * * * *